US007740185B2

(12) United States Patent
Müller

(10) Patent No.: US 7,740,185 B2
(45) Date of Patent: Jun. 22, 2010

(54) TEMPERING METHOD, CONTROL DEVICE AND TEMPERING DEVICE

(75) Inventor: Klaus Georg Matthias Müller, Remlingen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 1387 days.

(21) Appl. No.: 10/539,555

(22) PCT Filed: Dec. 11, 2003

(86) PCT No.: PCT/DE03/04098

§ 371 (c)(1),
(2), (4) Date: Jun. 17, 2005

(87) PCT Pub. No.: WO2004/054805

PCT Pub. Date: Jul. 1, 2004

(65) Prior Publication Data

US 2006/0086812 A1 Apr. 27, 2006

(30) Foreign Application Priority Data

Dec. 17, 2002 (DE) ................................ 102 58 927
Jun. 24, 2003 (DE) ................................ 103 28 234

(51) Int. Cl.
*G05D 23/275* (2006.01)

(52) U.S. Cl. .................. 236/78 D; 101/487; 236/78 B; 62/175

(58) Field of Classification Search ................. 101/487; 62/175; 236/78 B, 78 D
See application file for complete search history.

(56) References Cited

U.S. PATENT DOCUMENTS

| | | | | |
|---|---|---|---|---|
| 3,415,720 | A * | 12/1968 | Rijnsdorp et al. | 202/181 |
| 4,734,872 | A | 3/1988 | Eager et al. | |
| 4,852,008 | A * | 7/1989 | Sager | 701/70 |
| 5,025,381 | A * | 6/1991 | Goodzeit et al. | 701/13 |
| 5,657,637 | A * | 8/1997 | Mertens | 62/175 |
| 5,931,376 | A * | 8/1999 | Meyer | 236/44 C |
| 6,289,984 | B1 | 9/2001 | Lagger | |

FOREIGN PATENT DOCUMENTS

| | | |
|---|---|---|
| CH | 520367 | 2/1970 |
| DE | 44 29 520 A1 | 2/1996 |
| EP | 0 383 295 A2 | 2/1990 |
| EP | 0 886 577 B1 | 12/1999 |
| EP | 1 011 037 A2 | 6/2000 |
| JP | 60-161152 | 8/1985 |
| JP | 62074112 | 4/1987 |
| JP | 63067603 | 3/1988 |
| JP | 9260294 | 10/1997 |
| JP | 2002055722 | 2/2002 |

* cited by examiner

*Primary Examiner*—Frantz F. Jules
*Assistant Examiner*—Azim Rahim
(74) *Attorney, Agent, or Firm*—Jones, Tullar & Cooper, P.C.

(57) ABSTRACT

A method for controlling the temperature of a machine part, by the use of a regulating device, is accomplished by determining one respective value of a measured temperature at each of two separate spaced-apart measured points, which two points are located along a control distance. One of these measured values is fed to each of two control circuits of the regulating device which two control circuits are connected to each other in a cascade-type manner.

23 Claims, 8 Drawing Sheets

TEMPERING METHOD, CONTROL DEVICE AND TEMPERING DEVICE

CROSS-REFERENCE TO RELATED APPLICATIONS

This patent application is the U.S. national phase, under 35 USC 371, of PCT/DE2003/004098, filed Dec. 11, 2003; published as WO 2004/054805 A1 on Jul. 1, 2004; and claiming priority to DE 102 58 927.5, filed Dec. 17, 2002 and to DE 103 28 234.3, filed Jun. 24, 2003, the disclosures of which are expressly incorporated herein by reference.

FIELD OF THE INVENTION

The present invention is directed to a method for controlling a temperature, to a regulating device, as well as to a device for controlling a temperature.

BACKGROUND OF THE INVENTION

A device and a method for the temperature control of a component of a printing press is known from DE 44 29 520 A1. The temperature of the component is controlled by use of an at least partially circulating fluid. An actuating member, by use of which a mixture ratio between two fluid flows at different temperatures can be adjusted at a feed-in point, is controlled via a temperature measuring point arranged between the feed-in point and the component.

EP 0 886 577 B1 discloses a device and a method for controlling the temperature of a component. A component temperature is monitored by sensors and the measured value is sent to a control unit. If the temperature measured at the component differs from a command variable, the control unit lowers or increases the temperature of a coolant in a cooling unit by a defined value, waits for a length of time and repeats the measurement and the mentioned steps until the control variable has again been attained.

A temperature control device for printing presses is known from EP 0 382 295 A2. A temperature of the fluid in an inflow section, and a surface temperature of the component whose temperature is to be controlled are detected and are supplied to a control device. A manipulated variable for regulating a mixing motor is determined on the basis of these temperatures, as well as possibly predetermined disturbance variables, such as the paper used, the percentage of dampening agent and target temperatures, which set the relationship between the fluid conducted in the circuit and freshly temperature-controlled fluid.

JP 60-161152 A discloses a cooling device for a roller whose temperature is to be controlled. A surface temperature of the roller, as well as a fluid temperature in the inflow path, are measured and are supplied to a regulating device for comparison with a command variable and for controlling a valve.

SUMMARY OF THE INVENTION

The object of the present invention is directed to providing a method for controlling a temperature, a regulating device, as well as a device for controlling a temperature.

In accordance with the present invention, this object is attained by measuring temperature values at several selected points. These values are provided to a regulating device that has at least two regulating circuits. These at least two regulating circuits are connected to each other in a cascade-like manner. The temperature measuring points are spaced apart from each other in a measuring section.

The advantages to be gained by the present invention lie, in particular, in that the regulating device operates very rapidly and dependably, even over existing extended conveying distances for the temperature control medium. The short reaction time allows its employment in applications and processes with large dynamic components. Thus, the instant temperature control is of great advantage even in cases where it is necessary to follow rapid changes of a temperature command variable and/or where external conditions, such as the energy yield, because of friction or external temperatures, change very rapidly.

The rapid regulation in spite of a possibly extended conveying distance for the fluid is achieved for one in that further regulating circuits, and, in particular, two regulating circuits, underlie a regulating circuit monitoring the temperature at the component. Also, in a simplified embodiment, the direct determination of the temperature can be omitted and a further regulating circuit can underlie a regulating circuit that is monitoring the temperature at the entry to the component. Thus, the regulating path from the location of the preparation of the temperature control medium (mixing, heating, cooling) to the destination, such as, for example, the component itself or the entry to the component, is therefore divided into several partial paths and partial running times.

It is of great advantage here that an innermost regulating circuit monitors the temperature of the temperature control medium during its preparation (mixing, heating, cooling) at a very close distance and regulates it, so that an error possibly occurring during processing is detected at the start of the conveying path and is removed by regulation, instead of the error not being detected and steps being taken only when it reaches the component.

Embodiments of the present invention are of particular advantage wherein a pre-regulation in regard to the heat flow (losses), in regard to the running times, and/or in regard to the number of revolutions of the machine takes place. A further acceleration of the regulating process can be achieved by a pre-regulation with regard to an amplitude excess and/or with regard to the inclusion of the return temperature.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
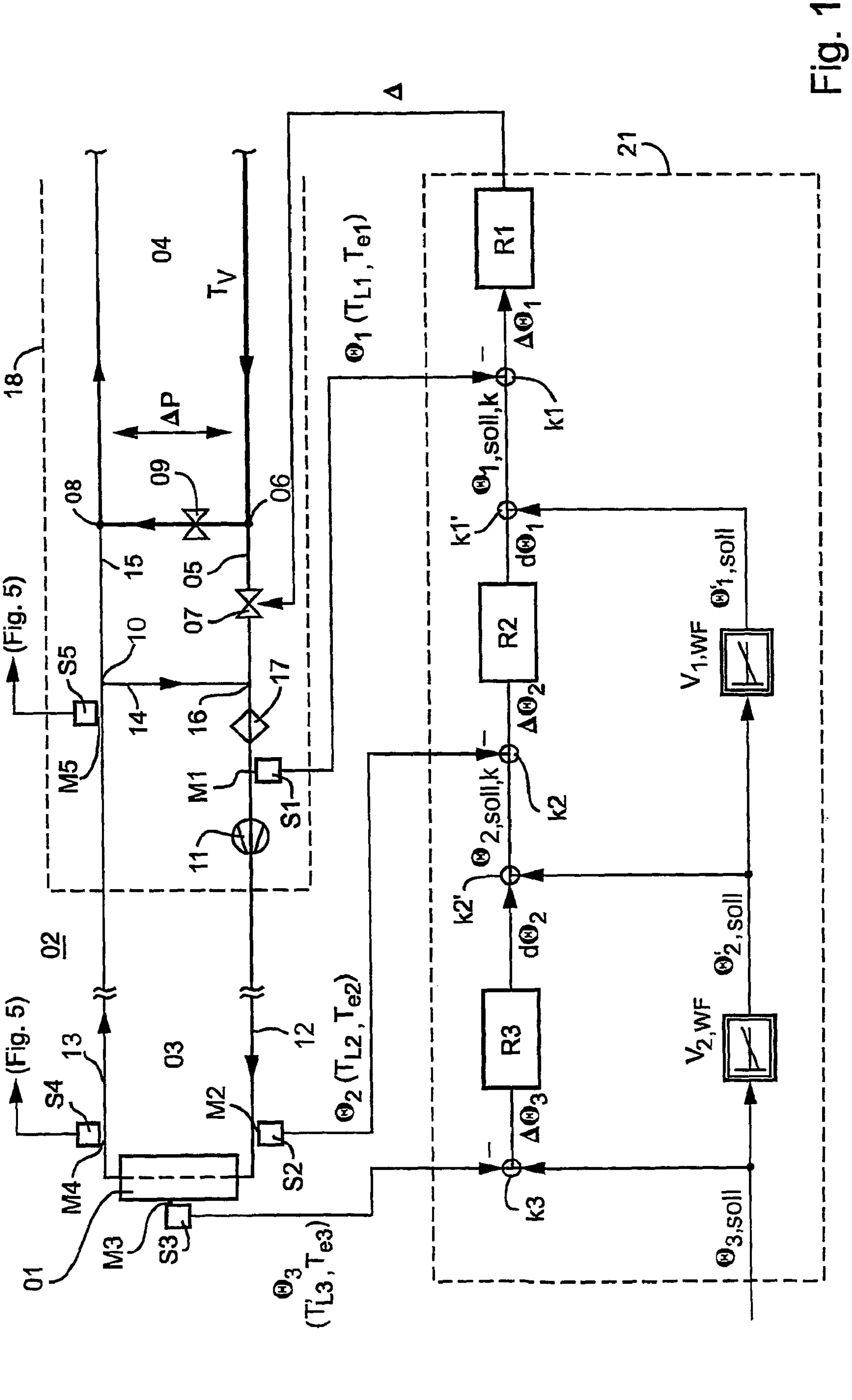
FIG. 1, a schematic representation of a temperature control path with a first preferred embodiment of the regulating device or the regulating process of the present invention, in FIG. 2, a second preferred embodiment of the regulating device or the regulating process, in FIG. 3, a third preferred embodiment of the regulating device or the regulating process, in FIG. 4, a fourth preferred embodiment of the regulating device or the regulating process, in FIG. 5, a further development of the invention in accordance with FIGS. 1 to 4 and relating to the inner regulating circuit, in FIG. 6, a further development of the invention in accordance with FIGS. 1 to 4 and relating to the outer regulating circuit, in FIG. 7, a schematic representation of a running-time based regulator, in FIG. 8, a detailed depiction of a portion of the temperature control path represented in FIG. 1, in FIG. 9, a first preferred embodiment of a swirling chamber in accordance with the present invention, in FIG. 10, a second preferred embodiment of a swirling chamber, and in FIG. 11, a third preferred embodiment of a swirling chamber.

The temperature of a component 01 of a machine, such as, for example, a printing press, is to be controlled. The component 01 of the printing press is, for example, a part of a printing group, not represented, and in particular is an ink-conducting roller 01 of a printing group. This roller 01 can be embodied as a roller 01 of an inking system, such as, for example, as a screen roller 01, or as a cylinder 01 of the printing group, such as, for example, a forme cylinder 01. The device and the method for temperature control described in what follows can be particularly advantageously employed in connection with a printing group for waterless offset printing, such as in a printing group operating without the use of a dampening agent. In a printing group, and in particular in a printing group for waterless offset printing, the quality of the ink transfer depends particularly on the temperature of the ink and/or of the ink-conducting surfaces, such as, for example, the shell faces of rollers 01 or cylinders 01. Moreover, the quality of the ink transfer is also sensitive to a splitting speed, such as the number of revolutions of the machine.

Temperature control takes place via a temperature control medium, and in particular via a fluid, such as water, for example, which is brought into thermal interaction with the component 01 along a temperature control path 02. If the fluid is to flow against the component 01, the fluid can also be a gas or a gas mixture, such as air, for example. For temperature control, the fluid is provided to the component 01 in a first circuit 03, flows through or around the component 01, absorbs heat, for cooling or gives off heat, for heating and flows back again, respectively heated or cooled. A heating or cooling unit can be arranged in this first circuit 03, which can be used for providing the desired fluid temperature.

In an advantageous embodiment of the present invention, and in accordance with FIG. 1, however, the first circuit 03 is connected as a secondary circuit 03 with a second circuit 04, which is a primary circuit 04, and in which circuit 04 the fluid circulates at a defined and mainly constant temperature Tv, for example a flow temperature Tv. A temperature control device, such as, for example, a thermostat, a heating and/or cooling unit, or the like, which provides the flow temperature Tv, is not represented here. Fluid can be taken from the primary circuit 04 and metered into the secondary circuit 03 via a connection 05 between the primary and secondary circuits 04, 03 at a first connection point 06 of the primary circuit 04 by the use of an actuating member 07, for example a controllable valve 07. Depending on the amount of any addition of fresh fluid at the connecting point 06, fluid from the secondary circuit 03 is returned to the primary circuit 04 via a connection 15 at a second connection point 08. For this purpose, the fluid is, for example, at a higher pressure level in the area of the first connecting point 06 than it is in the area of the second connecting point 08. A difference $\Delta p$ pain the pressure level is generated, for example, by an appropriate valve 09 between the connecting points 06, 08.

The fluid, or a larger portion of the fluid, is circulated in the secondary circuit 03 by the use of a drive mechanism 11, for example by a pump 11, a turbine 11 or in another way, on an inflow path 12 through the component 01, on a return flow path 13 and on a partial path 14 between the inflow and the return flows paths 12, 13. Depending on the inflow via the valve 07, after passing through the component 01, an appropriate amount of fluid flows off via the connection 15 into the secondary circuit 04, or an appropriately reduced amount of fluid flows through the partial path 14. The portion of the fluid flowing back through the partial path 14 and the portion of the fluid which is freshly flowing in via the valve 17 at a feed-in or an injecting point 16 are mixed and now constitute the fluid which is specifically temperature-controlled for the temperature control process. To improve the intermixing, a swirling section 17, and in particular a swirling chamber 17, is arranged as closely as possible downstream of the injection point 16, and in particular between the injection point 16 and the pump 11.

In the above mentioned case, wherein temperature control is not performed by a primary circuit 04, but by a heating or cooling unit, the feed-in or the injection point 16 corresponds to the location of the energy exchange by the respective heating or cooling unit, and the actuating member 07, for example, to an output control or the like. The connecting point 10 in the circuit 03 is omitted, since the fluid circulates altogether in the circuit 03, and energy is supplied or removed, or heat or cold is "fed in" at the feed-in point 16. In this case, the heating or cooling unit corresponds to the actuating member 07, for example.

It is intended in the end, by use of the temperature control, to set or to maintain a defined temperature $\Theta_3$ of the component 01, and in particular in the case of a cylinder 01, the surface temperature $\Theta_3$ on the roller 01, to a defined command variable $\Theta_{3,soll}$. This is achieved by measuring a statement-capable temperature on the one hand, and by a regulation of the supply of fluid from the primary circuit 04 to the secondary circuit 03 for creating an appropriate mix temperature on the other hand.

It is now important that at least two measuring points M1, M2, M3 with sensors S1, S2, S3 are provided in the instant device, or by the instant method, between the injection point 16 and an exit of the component 01 to be temperature-controlled. One of the measuring points M1 is arranged near the injection point 16, and at least one of the measuring points M2, M3 in an area which is close to the component of the inflow path 12 and/or in the area of the component 01 itself. As a rule, the valve 07, the pump 11, the injection point 16, as well as the connecting points 06, 08 are arranged spatially close to each other and are located, for example, in a temperature control cabinet 18, which is indicated by dashed lines. As a rule, the inflow and the return flow paths 12, 13 between the component 01 and the not explicitly represented exit from, or entry into the temperature-control cabinet 18 have a comparatively great length in regard to the other paths, which is indicated in FIG. 1 by respective interruptions. The locations for the measurements have now been selected in such a way that at least one measuring point M1, respectively, is arranged in the vicinity of the temperature control cabinet 18, and one measuring point M2, M3 is arranged near the component, i.e. at the end of the long inflow path 12.

In the preferred embodiment of the present invention, in accordance with FIG. 1, the measurement of a first temperature $\Theta_1$ is performed between the injection point 16 and the pump 11, and in particular between a swirling section 17 and the pump 11, by a first sensor S1. A second temperature $\Theta_2$ is determined by a second sensor S2 in the area of the entry into the component 01. In FIG. 1, the temperature $\Theta_3$ is also determined by measurement, namely by an infrared sensor, such as IR sensor S3 directed onto the surface of the roller 01.

The sensor S3 can also be arranged in the area of the shell face or, as explained below, possibly can also be omitted.

Temperature control takes place by a regulating device 21, or a regulating process 21, which will be described in greater detail in what follows. The regulating device 21, as seen in FIG. 1 is based on a multi-loop, here a triple-loop cascade regulation. An innermost regulating circuit has the sensor S1 shortly downstream of the injection point 16, a first regulator R1 and the actuating member 07, i.e. the valve 07. The regulator R1 is provided with a deviation $\Delta\Theta_1$ of the measured value $\Theta_1$ from a corrected command variable $\Theta_{1,soll,k}$, node K1 as the input value and acts, in accordance with its implemented regulation behavior and/or its regulation algorithm, with an actuating order $\Delta$ on the actuating member 07. This means that, depending on the deviation of the measured value $\Theta_1$ from the corrected command variable $\Theta_{1,soll,k}$, it opens or closes the valve 07 or maintains the valve position. The corrected command variable $\Theta_{1,soll,k}$ is now not directly specified by a control device or manually, as is otherwise customary, but is formed with the use of an output value from at least one second, further "outward" located regulating circuit. The second circuit has the sensor S2 located shortly prior to the fluid entry into the component 01, as well as a second regulator R2. The regulator R2 is provided with a deviation $\Delta\Theta_2$ of the measured value $\Theta_2$ at the sensor S2 from a corrected command variable $\Theta_{2,soll,k}$, node K2, as the input value, and at its output generates a value $d\Theta_1$, output value $d\Theta_1$ in accordance with its implemented regulation behavior and/or its regulation algorithm, which is used for forming the above mentioned corrected command variable $\Theta_{1,soll,k}$ for the first regulator R1. This means that, depending on the deviation of the measured value $\Theta_2$ from the corrected command variable $\Theta_{2,soll,k}$, an influence is brought to bear by the value $d\Theta_I$ on the corrected command variable $\Theta_{1,soll,k}$ of the first regulator R1 to be formed.

In a preferred embodiment of the present invention, the corrected command variable $\Theta_{1,soll,k}$ for the first regulator R1 is formed at a node K1', for example by addition, or subtraction from the value $d\Theta_1$ and a theoretical command variable $\Theta'_{1,soll}$. In turn, the theoretical command variable is $\Theta'_{1,soll}$ formed in a pre-regulation member in regard to the heat flow $V_{WF}$. The pre-regulation member $V_{WF}$, in this case $V_{1,WF}$, subscript 1 for forming the command variable of the first regulating circuit, takes the heat exchange, such as losses etc., of the fluid on a partial path into consideration and is based on empirical values, such as expert knowledge, calibration measurements, etc. In this way, the pre-regulation member $V_{1,WF}$ takes the heat or cooling losses along the partial path between the measuring points M1 and M2 into consideration in that it forms an appropriately raised or lowered theoretical command variable $\Theta'_{1,soll}$, which is then processed, together with the value $d\Theta_1$, into the corrected command variable $\Theta_{1,soll,k}$ for the first regulator R1. A connection between the input value, i.e. the command variable $\Theta_{3,soll}$ or $\Theta'_{2,soll}$ or $\Theta'_{2,soll,n}$, as discussed below, and a corrected output value, such as a modified command variable $\Theta'_{2,soll}$ or $\Theta'_{2,soll,n}$, see below, or $\Theta'_{1,soll,n}$, is fixedly stored in the pre-regulation member $V_{WF}$, which can preferably be changed by parameters, or in another way, as needed.

In principle, a simple embodiment of the regulating device is possible, wherein only the two first mentioned regulating circuits form the cascade regulating device. In this case, the pre-regulation member $V_{1,WF}$ would be specified as the input value by a machine control device, or by a defined command variable $\Theta_{2,soll}$ manually. It would also be used for forming the above mentioned deviation $\Delta\Theta_2$ upstream of the second regulator R2.

However, in the embodiment of the invention which is represented in FIG. 1, the regulating device 21 has three cascaded regulating circuits. The corrected command variable $\Theta'_{2,soll,k}$ upstream of the second regulator R2 is now also not directly specified, as is otherwise customary, by a control device or manually. It is formed with the use of an output value from a third outer regulating circuit. The third regulating circuit has the sensor S3, which detects the temperature on, or in the area of, the shell face, as well as a third regulator R3. The regulator R3 is provided with a deviation $\Delta\Theta_3$ of the measured values $\Theta_3$ at the sensor S3 from a command variable $\Theta_{3,soll}$, node K3 as the input value, and corresponding to its implemented regulation behavior and/or its regulation algorithm, it generates, at its output, a value $d\Theta_2$ correlated with the deviation $\Delta\Theta_3$, which is also used for forming the above mentioned corrected command variable $\Theta_{2,soll,k}$ for the second regulator R2. This means that, depending on the deviation of the measured value $\Theta_3$ from the command variable $\Theta_{3,soll}$ or from a corrected command variable $\Theta''_{3,soll}$, as discussed below specified by a machine control device or manually entered, influence is brought to bear by the value $d\Theta_2$ on the corrected command variable $\Theta_{2,soll,k}$ of the second regulator R2 to be formed.

The corrected command variable $\Theta_{2,soll,k}$ for the second regulator R2 is formed at a node K2', by, for example addition, or subtraction from the value $d\Theta_2$ and a theoretical command variable $\Theta'_{2,soll}$, or $\Theta''_{2,soll}$, see below. In turn, the theoretical command variable $\Theta'_{2,soll}$ is formed in a pre-regulation member in regard to the heat flow $V_{2WF}$. The pre-regulation member $V_{2WF}$, for example takes the heat or cooling losses on the partial path between the measuring points M2 and M3 into consideration by forming an appropriately raised or lowered command variable $\Theta'_{2,soll}$ which then, together with the value $d\Theta_2$, is processed as the corrected command variable $\Theta_{2,soll,k}$ for the second regulator R2.

Thus, the above-described method is based, for one, on the measurement of the temperature directly downstream of the injection point 16, as well as on at least one measurement taken close to the component 01 whose temperature is to be controlled. Secondly, a particularly short reaction time of the regulation is achieved in that several regulating circuits interact in a cascade-like manner and that in the course of the command variable formation for the inner regulating circuit, a measured value $\Theta_2$, $\Theta_3$ is taken into consideration. Thirdly, a particularly short reaction time is achieved by pre-regulation, which provides empirical values for losses to be expected on the temperature control path 02. Thus, a regulation circuit, which is located closer to the actuating member 07, is already provided with a command variable that is appropriately raised or lowered by an empirical value in expectation of losses.

Figure 2:
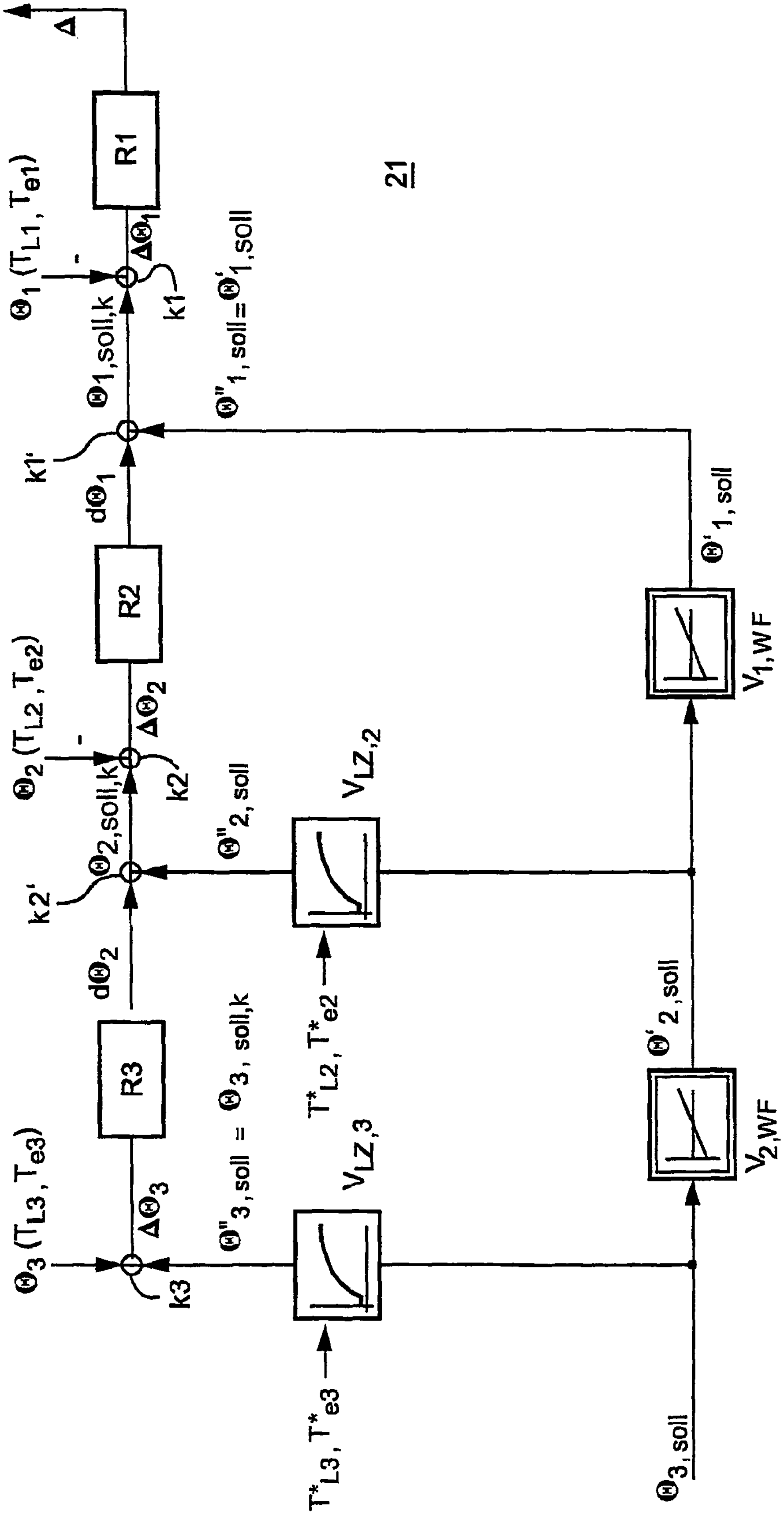

In an advantageous embodiment of the present invention, in accordance with FIG. 2, the regulating device 21 has further pre-regulation devices besides the pre-regulation member in regard to heat flow $V_{1,WF}$, $V_{2,WF}$.

As can be seen in FIG. 1, the fluid requires a final running time $T_{L2}$ for the path from the valve 07 to the sensor S2. Moreover, in the course of actuating the actuating member 07, the respective mix temperature does not immediately change to the desired value as a result of, for example, inertia of the valve, or heating or cooling of the pipe walls and pump, but instead is subject to a time constant $T_{e2}$. If this time constant, as in the embodiment in accordance with FIG. 1, is not taken into consideration, increased fluctuations of the regulating device can occur, since, for example, a command for opening the valve 07 was given, but the result of the opening, namely the addition of respectively warmer or colder fluid, might not have reached the measuring location of the measuring point M2, so that the respective regulating circuit continuous to erroneously issue a further actuating command for opening the valve. The same applies to the path from the valve 07 to the detection of the temperature by the sensor S3 with the running time $T'_{L3}$ and with a time constant $T'_{e3}$, wherein here the marked reference symbol indicates that this need not be the time until the detection of the fluid temperature in the area of the roller shell face, but instead may be the time until the detection of the temperature of the roller surface or of the roller shell.

Based on the idle time, which corresponds to running time $T_{L2}$ or $T'_{L3}$ and the time constant $T_{e2}$ or $T'_{e3}$, the path reactions to the activities of the innermost regulator R1, toward the level of the two outer regulators R2, R3, do not become immediately visible. In order to avoid, or to prevent, a double reaction of these regulators caused by this, which would be exaggeratedly wrong and which could not be recovered, a pre-regulation member, in regard to the running time and/or to the time constant $V_{LZ}$ and in the form of a path model member, is provided in one or in several of the control circuits in the course of forming the command variable, by the use of which the expected "natural" delay in the result of a change at the actuating member 07 is taken into consideration. The running time actually required by the fluid, determined, on the basis of empirical values or preferably by measured value recordation, or by calculated estimates is simulated in the regulation by the pre-regulation member in regard to the running time and/or to the time constant $V_{LZ}$. Now, the outer regulators M2, M3 only react to those deviations which, taking into consideration the modeled path properties, are not expected and which therefore actually require repair. The outer regulators R2, R3 are "blinded" by this symmetrization to the regulation deviations which are expected anyway and which are physically unavoidable, and of which deviations the innermost regulator R1 already takes care of "locally". In this way, the "pre-regulation member" $V_{LZ}$ acts in the manner of a "running time and delay member" $V_{LZ}$. The above-mentioned dynamic property, running time and delay is mapped in the pre-regulation member $V_{LZ}$ and is permanently stored, but can preferably be changed, as needed, by parameters or in another way. To this end, appropriate parameters $T^*_{L2}$, $T^*_{e2}$, $T^*_{L3}$, $T^*_{e3}$, which are intended to simulate and to represent, for example the actual running time $T_{L2}$, $T'_{L3}$ and/or the replacement constant $T_{e2}$, $T_{e3}$, can be adjusted at the pre-regulation member $V_{LZ}$. The adjustment should take place in such a way that, with this, a virtual dynamic course of the command variable created by calculation, for example the command variable $\Theta''_{2,soll}$ or $\Theta''_{3,soll}$, is compared, substantially synchronously in time, with the corresponding course of the measured value $\Theta_2$ or $\Theta_3$ of the temperature at the associated sensor S2 or S3 and the node K2 or K3.

For the outer regulating circuit, the virtual changed command variable $\Theta''_{3,soll}$ corresponds to the command variable $\Theta_{3,soll,k}$ which is to be compared with the measured value, since it is not corrected by a further regulating circuit. In the preferred embodiment, no pre-regulating member $V_{LZ}$ besides it is provided in the innermost regulating circuit, having very short paths or running time. In a unification of the nomenclature, here the command variable $\Theta'_{3,soll}$ therefore represents the command variable $\Theta''_{3,soll}$ without any further changes.

Such a pre-regulation member $V_{LZ}$, which represents the path model, is provided at least for forming the command variable for the regulating circuit or the regulating circuits assigned to the sensor S2, or to the sensors S2, S3 close to the component. In the example, the two outer regulating circuits have such a pre-regulating member $V_{LZ,2}$, $V_{LZ,3}$ in their command variable formation process. If the path between the valve 07 and the sensor S1 should also prove to be too long and too interfering, it is also possible to provide an appropriate pre-regulation member $V_{LZ,1}$ in the command value formation process for the inner regulating circuit.

Figure 3:
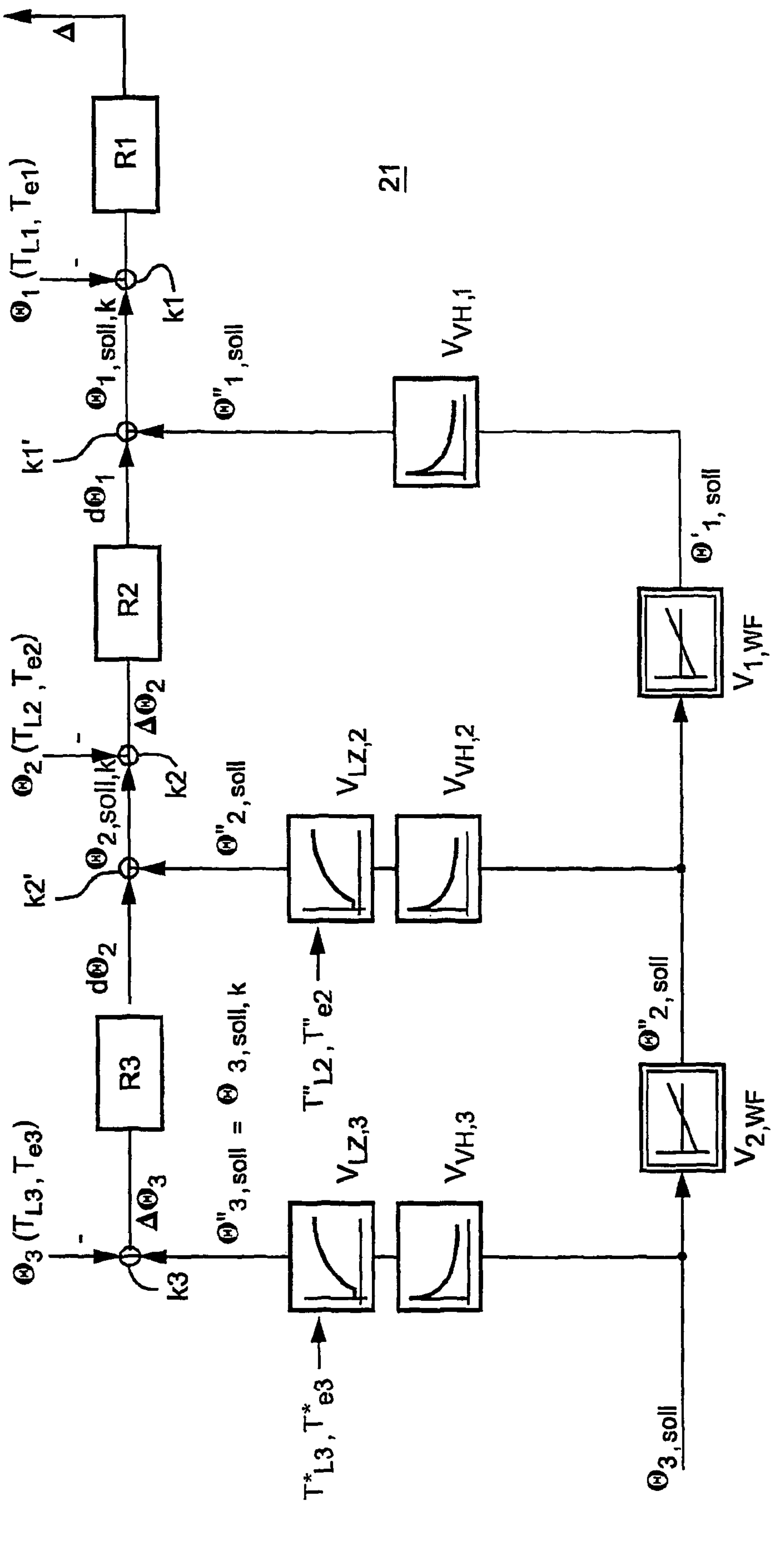

A further improvement of the regulating dynamics can be achieved with the further development of the above-mentioned regulating device, in accordance with FIG. 3, if the conversion of the desired course of the command variable on the level of the innermost regulating circuit is made faster and with less of a drag distance, by a derivative member $V_{VH,1}$ in the form of a time constant exchanger, for example of the 1st order, such as a lead-lag filter. This pre-regulation, in the form of the derivative member $V_{VH,I}$, initially causes an excess of amplitude, or an overcompensation in the reaction in order to accelerate the regulating process in the respective start phase, and then returns to neutral.

To prevent any stability problems, this step preferably takes place only in the portion of the command variable not affected by actual values, i.e. ahead of the respective node K1, K2', addition or subtraction point depending on the mathematical sign. To maintain this symmetrization at the outer regulators R2, R3, this dynamic step then must be compensated there by use of appropriate derivative members $V_{VH,2}$ or $V_{VH,3}$, which act, in addition to the mentioned pre-regulations $V_{WF}$, in regard to the heat flow and $V_{LZ}$, in regard to the running time and/or the time constants during the formation of the command variable of the subsequent regulating circuit.

The property of the course of the mentioned excess increase, in relation to the input signal is mapped in the pre-regulating member $V_{VH,1}$ and is permanently stored, but its size or course can be changed as needed, preferably by parameters or in other ways. In accordance with the physical sequence, the derivative member $V_{VH,1}$, in regard to the signal path, is preferably arranged ahead of the pre-regulating member $V_{LZ}$, if provided, and behind the pre-regulating member $V_{WF}$, if provided. The pre-regulation member $V_{VH}$, in accordance with one of the embodiments of FIGS. 1 to 4, can also be used independently of, or in addition to, the presence of the pre-regulation members $V_{LZ}$, $V_{DZ}$ or $V_{AB}$, see below.

Figure 4:
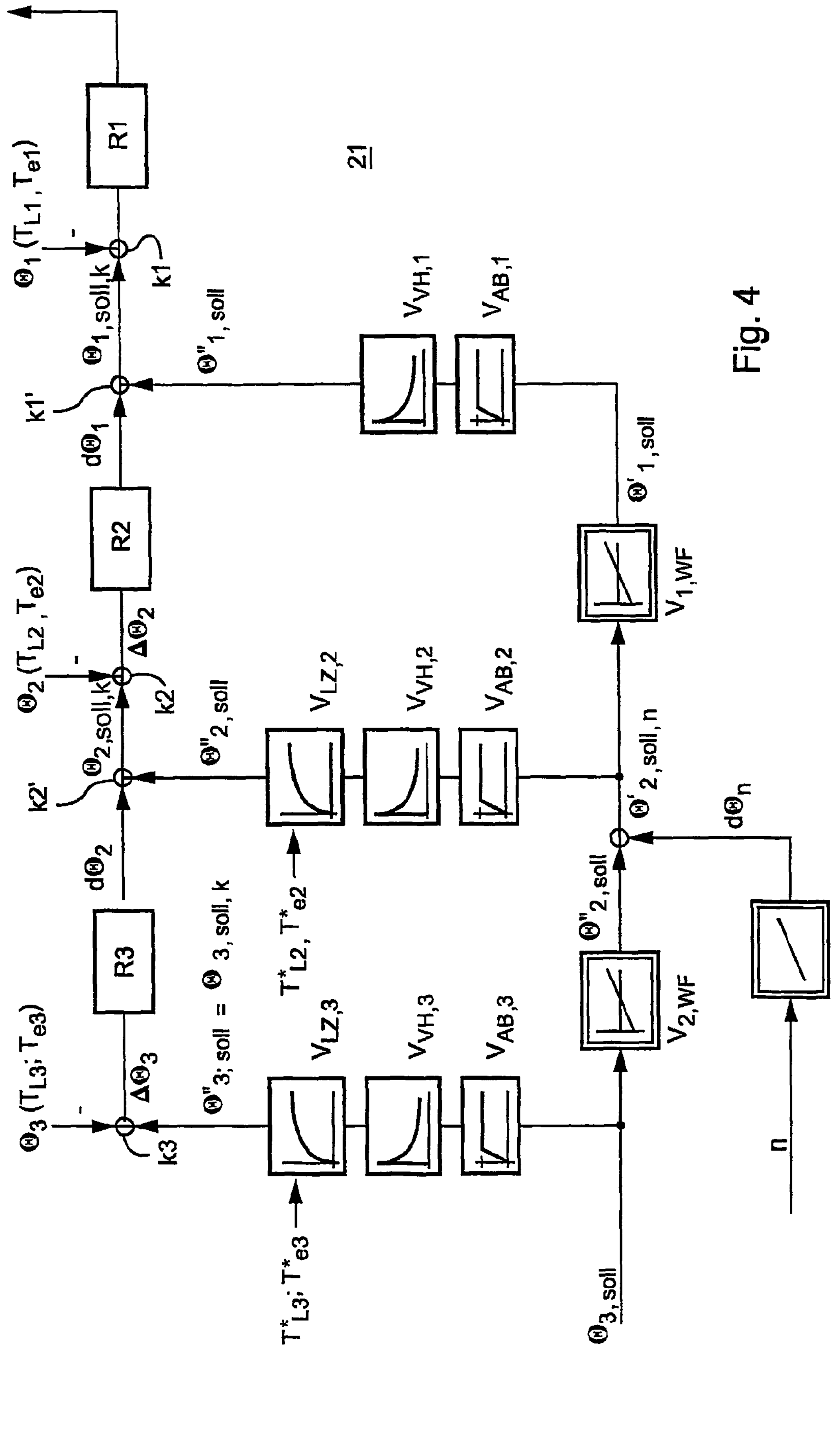

In a further development of the regulating devices of the present invention, and in accordance with FIGS. 1, 2 and 3, a further improvement of the regulation dynamics can be achieved if, in addition to the above-mentioned pre-regulating devices $V_{WF}$ in regard to the heat flow, in regard to the running time, and/or the time constant $V_{LZ}$ and/or the derivative member $V_{VH}$, a pre-regulation in regard of the number of revolutions of the machine $V_{DZ}$ takes place, as seen in FIG. 4. More or less frictional heat is produced in a printing group as a function of the number of revolutions n of the machine. If it is intended to maintain the mass flow of the fluid substantially constant, increased frictional heat can only be generated via a lowering of the fluid temperature, and vice versa. The above described regulating device would doubtlessly react over time to a change in the frictional heat by lowering or by increasing the fluid temperature, but only after the temperature at the sensor S3 indicates the undesired temperature.

In order to further increase the dynamics of the regulating device 21, in particular under changing operating conditions, such as during a start-up phase, during a change in the number of revolutions, or the like, the pre-regulating member $V_{DZ}$ in regard to the number of revolutions is provided, which can basically be superimposed on all lower-order command valuable formations, which therefore have an actuating value character, i.e. the formation of the command variables $\Theta''_{1,soll}$, $\Theta''_{2,soll}$, $\Theta''_{3,soll}$. However, a superimposition of the outer regulating circuit does not make sense as long as the value measured at the sensor S3 represents the technologically final valid actual value, for example the temperature on the effective surface, i.e. on the shell face itself. In the preferred embodiment, the pre-regulating member $V_{DZ}$ only acts on the formation of the command variables $\Theta''_{1,soll}$, $\Theta''_{2,soll}$, namely in that a correction value $d\Theta_n$ is superimposed on the theoretical command variable $\Theta'_{2,soll}$ created in the pre-regulating member $V_{2,WF}$, which is arranged upstream of the second regulating circuit. The command variable $\Theta'_{2,soll,n}$, which is created from this, is used directly, or via appropriate pre-regulation members $V_{VH,1}$ and/or $V_{LZ,1}$, for forming the command variable of the second regulating circuit R2, and simultaneously via pre-regulating member $V_{WF,1}$, and possibly the pre-regulating member $V_{VH,I}$ for forming the command variable of the first regulating circuit (R1). A connection between the number n of revolutions of the machine and a suitable correction is permanently stored in the pre-regulating member $V_{DZ}$, which can preferably be changed, as needed, via parameters or in other ways. The pre-regulating member $V_{DZ}$ can also be used in one of the embodiments in accordance with FIGS. 1 to 4 independently of the presence of the pre-regulating members $V_{LZ}$, $V_{VH}$ or $V_{AB}$, or in addition.

However, if the sensor S3 does not measure the shell face, but measures a temperature further inside of the component which technologically is not the final valid temperature, it can also be useful to let the pre-regulation member $V_{DZ}$ also act on the outer regulating circuit, R3. The same applies to an outer regulating circuit which obtains the measured value not directly from the component 01, but from a sensor S4, S5, see FIGS. 1 and 5, arranged after passage through the component 01, and which is possibly linked with the measured value from S2.

In a further development, as depicted in FIG. 4, a further pre-regulating member $V_{AB}$, in the form of a dynamic model member, such as for example, a rise limiter $V_{AB}$, which, in particular is non-linear, is provided directly ahead of the node K1 for forming the corrected command variable $\Theta_{1,soll,k}$. It adapts the finite actuating time, which is not equal to zero and the actual limitation of the actuating member 07 in respect to its maximal actuating path, i.e. even if a very great change is requested, to only a limited opening of the valve 07, and therefore so only a limited amount of temperature-controlled fluid can be provided from the primary circuit 04. The above-mentioned rise limitation, or property of the valve is mapped in the pre-regulating member $V_{AB}$ and is permanently stored, but can preferably be changed via parameters or in other ways, as needed. The pre-regulating member $V_{AB}$ is also usable independently of the presence of the pre-regulating members $V_{LZ,1}$, $V_{VH,1}$ or $V_{DZ}$, or can be additionally used in one of the embodiments in accordance with FIGS. 1 to 3.

Figure 5:
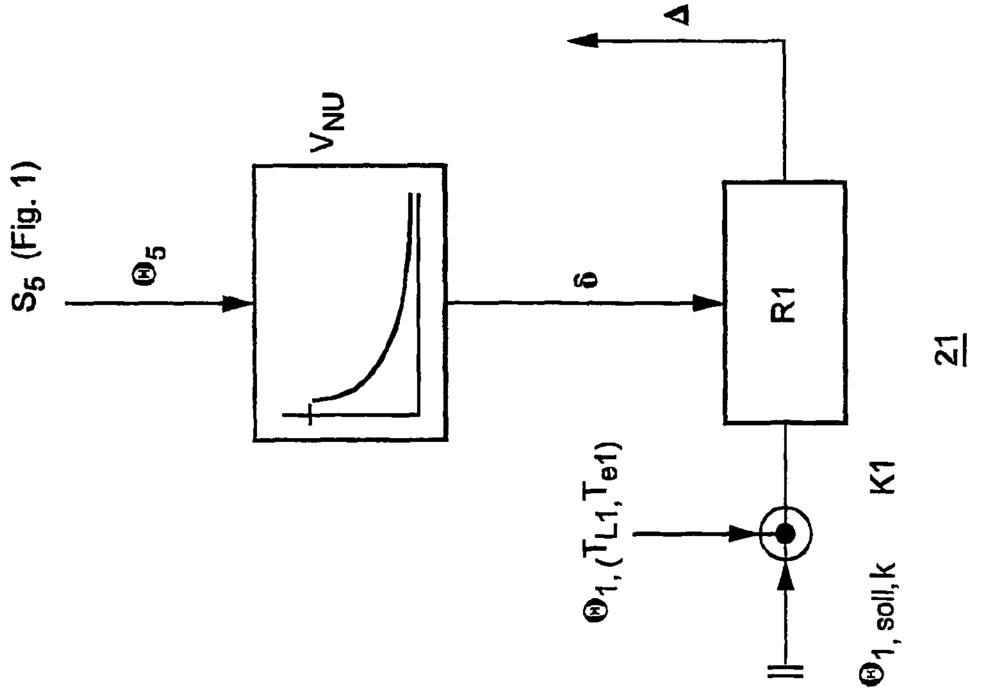

FIG. 5 shows a further development of the above-discussed embodiments the first regulating circuit, independently of the embodiments in accordance with FIG. 1, 2, 3 or 4. A measured value $\Theta_5$ of a sensor 5 is detected close to, or in the area of the partial path 14, i.e. at a short distance from the injection point 16, and is additionally used for regulation in the innermost regulating circuit. To this end, the measured value $\Theta_5$ is introduced as the input value into a further pre-regulating member $V_{NU}$ for dynamic zero point suppression. The measured value $\Theta_5$ provides information regarding the temperature, with which the returning fluid will be available, for the impending mixture with fed-in cooling or heating fluid. If the measured value suddenly greatly changes, for example if the temperature drops greatly, a correspondingly opposite signal $\sigma$, for example a strong increase of the opening in the valve 07, is created by the pre-regulating member $V_{NU}$ and is provided to the regulator R1. The re-regulating member $V_{NU}$ therefore causes a counteraction to a change shortly to be expected at the sensor S1 even before it has occurred there. In the ideal case, this change will not even occur there because of the application of this interference value.

The functional progress, and the amplification of the pre-regulating member $V_{NU}$ regarding this return flow pre-regulation are permanently stored and can preferably be changed by parameters.

Figure 6:
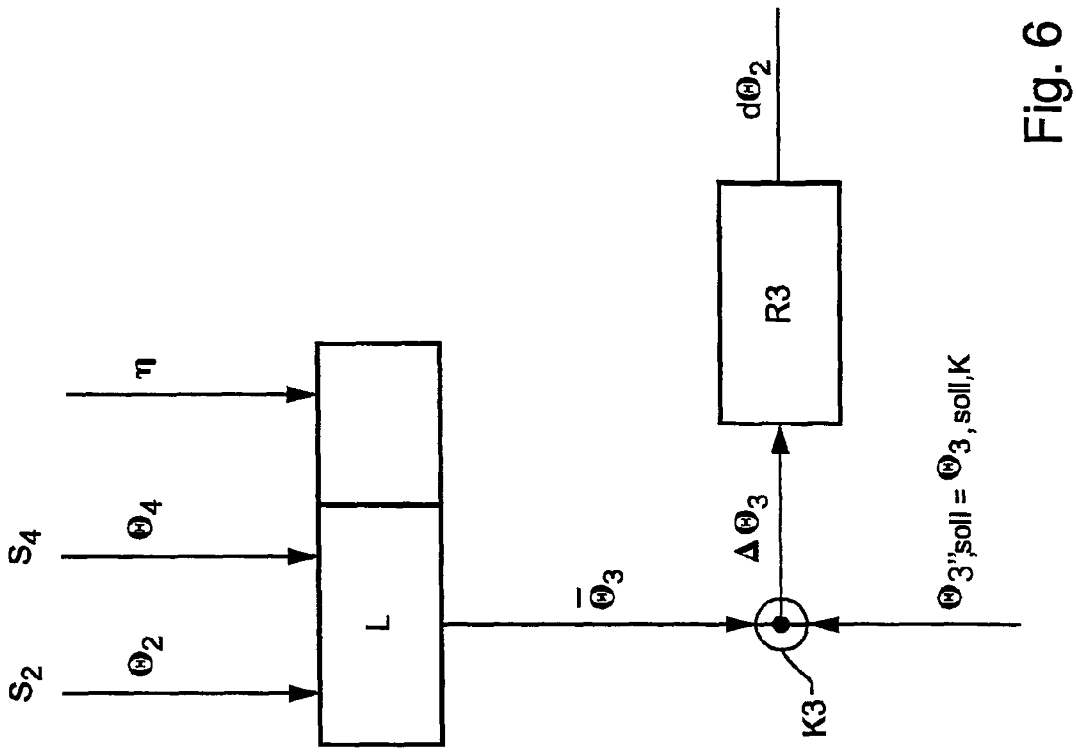

FIG. 6 shows a further development of the embodiments up to now of the outer regulating circuit independently of the embodiments in accordance with FIG. 1, 2, 3 or 4. In contrast to the previous explanations, a measured value $\Theta_3$ from a sensor S3, detecting the surface of the component or located in the shell surface, is not used, but instead the measured values $\Theta_2$ and $\Theta_4$ from sensors S2 and S4 near the component in the return flow path 12, 13 are used. These valves are processed, together with a number of revolutions signal n, in a logical unit L, or in a logical process L, by use of a permanently stored, but preferably changeable algorithm into $\overline{\Theta}_3$ a replacement measured value $\Theta_3$, for example the replacement $\Theta_3$ temperature $\overline{\Theta}_3$ of the component 01 (or its surface). This $\overline{\Theta}_3$ replacement measured value $\Theta_3$ is passed on to the node K3 as $\overline{\Theta}_3$ the measured value, or temperature $\Theta_3$, in place of the measured value $\Theta_2$, corresponding to the above mentioned preferred embodiments.

The regulators R1, R2, R3 from the preferred embodiments in accordance with FIGS. 1 to 4 are embodied in a simple design as PI regulators R1, R2, R3.

Figure 7:
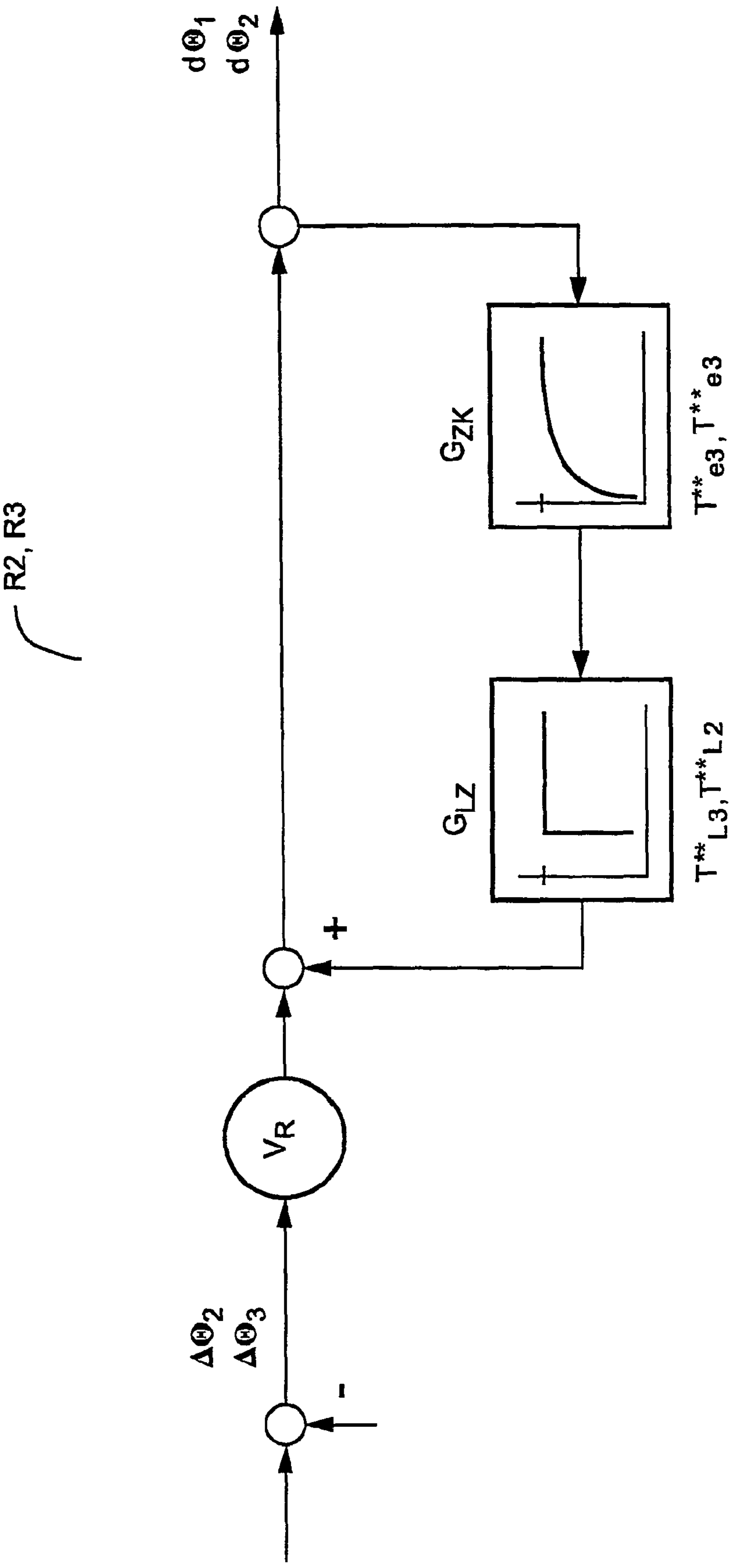

However, in an advantageous embodiment of the present invention, at least the regulators R2 and R3 are designed as so-called "running time-based regulators" or "Smith regulators". The running time-based regulators R2 and R3, in particular running time-based PI regulators R2 and R3 are represented in FIG. 7 as a replacement circuit diagram and are parameterized. The regulator R2, R3 has the deviation $\Delta\Theta_2$, $\Theta_3$ as the input value. It is designed as a PI regulator with a parameterizable amplification factor $V_R$, whose output signal is fed back via a replacement constant member $G_{ZK}$ and a running time member $G_{LZ}$, or as a member as represented with the pre-regulation member $V_{LZ}$.

The running time or the idle time of the regulating path, as well as its time constant, is mapped in the running time-based PI regulator R2, R3 and is permanently stored, but can preferably be changed via parameters or in other ways, as needed. For this purpose, appropriate parameters $T^{}_{L2}$, $T^{}_{e2}$, $T^{}_{L3}$, $T^{}_{e2}$, which, for example, are intended to represent the actual running time $T_{L2}$ or $T_{L3}$, and/or the time constant $T_{e2}$, $T_{e3}$, can be set at the PI regulator R2 and R3. With a correct setting and reproduction of the regulating path, the values of the parameters $T^{}_{L2}$, $T^{}_{e2}$, $T^{}_{L3}$, $T^{}_{e3}$, and the values of the parameters $T^{*}_{L2}$, $T^{*}_{e2}$, $T^{*}_{L3}$, $T^{*}_{e3}$ from the pre-regulating members $V_{LZ,1}$, in regard to the running time and the time constant, should substantially agree, since the respective regulating path is described by them in the regulator R2, R3, as well as in the pre-regulation member $V_{LZ}$. Accordingly it is possible to use running time-based PI regulators R2, R3, as well as pre-regulating members $V_{LZ}$ in the regulating device, and the same parameter sets, once determined, should be used for both.

The first section 12.1 extends from the injection point 16 as far as the first measuring point M1 with the first sensor S1 and has a path length X1, as well as a first average running time $T_{L1}$. The second section 12.2 extends from the first measuring point M1 up to a measuring point M2 "near the component", with the sensor S2. It has a second path length X2, as well as a second average running time $T_{L2}$. The third section 12.3 with a third path length X3, as well as a third average running time $T_{L3}$, adjoins the measuring point M2 and extends to the destination 22 (here the first contact of the fluid in the area of the extended shell face). A total running time T of the fluid from the injection point 16 to the destination therefore results from $T_{L1}+T_{L2}+T_{L3}$.

The first measuring point M1 has been selected "close to the feed-in point", i.e. at a short distance from the feed-in point 16, here the injection point 16. Thus, a measuring point M1 close to the feed-in point, or a sensor S1 close to the actuating means is understood to be a location in the area of the inflow path 12, which is located in regard to the running time $T_L$ of the fluid less than one tenth, in particular one-twentieth, of the distance from the feed-in point 16 to the first contact with the destination 22 (here the first contact of the fluid in the area of the extended shell face), i.e. $T_{L1}<0.1$ T, in particular $T_{L1}<0.5$ T applies. For a high degree of regulation dynamics, the measuring point M1 is located in respect to the running time $T_{L1}$ of the fluid maximally 2 seconds, in particular maximally 1 second, distant from the injection point 16. As already mentioned in connection with FIG. 1, the injection point 16, the sensor S1, as well as the downstream arranged pump 11, are arranged in a temperature-control cabinet 18, which constitutes a structural unit of the contained units. The measuring point M1 is preferably located upstream of the pump 11. The temperature-control cabinet 18 can be connected with the component 01 via releasable connections 23, 24 in the inflow path 12, as well as the return flow path 13.

As a rule, the component 01 and the temperature-control cabinet are not arranged directly adjoining each other in the machine, so that a line 26, for example pipes 26 or a hose 26, from the temperature-control cabinet 18 to an entry 27 into the component 01, for example to a lead-through 27, in particular a rotary lead-through 27, has a length of appropriate size. The lead-through into the roller 01 or the cylinder 01 is only schematically indicated in FIG. 8. If, as is customary, the roller 01 or the cylinder 01 has a journal at its front face, the lead-through is provided through the journal. The path of the fluid to the shell face, as well as inside the component 01 along the shell face is only symbolically represented and can extend in a known manner, for example in axial or helical conduits, in extended hollow chambers, in a circular ring cross section, or in other suitable ways underneath the shell face. The second measuring point M1 is "close to the component", i.e. selected at a short distance from the component 01, or the destination 22, in this case the shell face. Therefore a second measuring point M2, or a second sensor S2, close to the component, is understood to be a location in the area of the inflow path 12 which, in respect to the running time of the fluids, is farther removed than half the distance from the injection point 16 to the first contact with the destination (here the first contact of the fluid in the area of the extended shell face). $T_{L2}>0.5$ T applies here. In order to obtain great dynamics of the regulation, simultaneously along with low structural outlay at rotating components 01, the second measuring point M2 is arranged in the area of the line 26 fixed in place, yet outside of the rotating component 01, but is still located directly, i.e. distanced maximally three seconds in regard to the running time of the fluid, upstream of the entry 27 into the component 01.

The third measuring point M3, if provided, is also arranged at least "close to the component", but in particular "close to the destination". This means that it is located in close vicinity to the destination 22 of the fluid, or directly detects the surface to be temperature-controlled (in this case the shell face of the roller 01). In an advantageous manner the measuring point M3 does not detect the fluid temperature, such as is the case with the measuring points M1 and M2, for example, but the area to be temperature controlled of the component 01 itself. The direct vicinity of the destination 22 is here understood to mean that the sensor S3 is located between the fluid circulating in the component 01 and the shell face, or detects the temperature $\Theta_3$ on the shall face in a contactless manner.

In another embodiment of the temperature-control device it is possible to do without the measuring point S3. It is possible to draw conclusions regarding the temperature $\Theta_3$ from empirical values by means of the measured values of the measuring point M2, for example by means of a stored connection, an offset, a functional interrelationship. Then, for a desired temperature $\Theta_3$ a regulation to a desired temperature $\Theta_2$ is performed, taking into consideration the machine or production parameters (inter alia the number of revolutions of the machine, ambient temperature and/or fluid throughput, (doctor blade) coefficient of friction, heat progress resistance).

Figure 8:
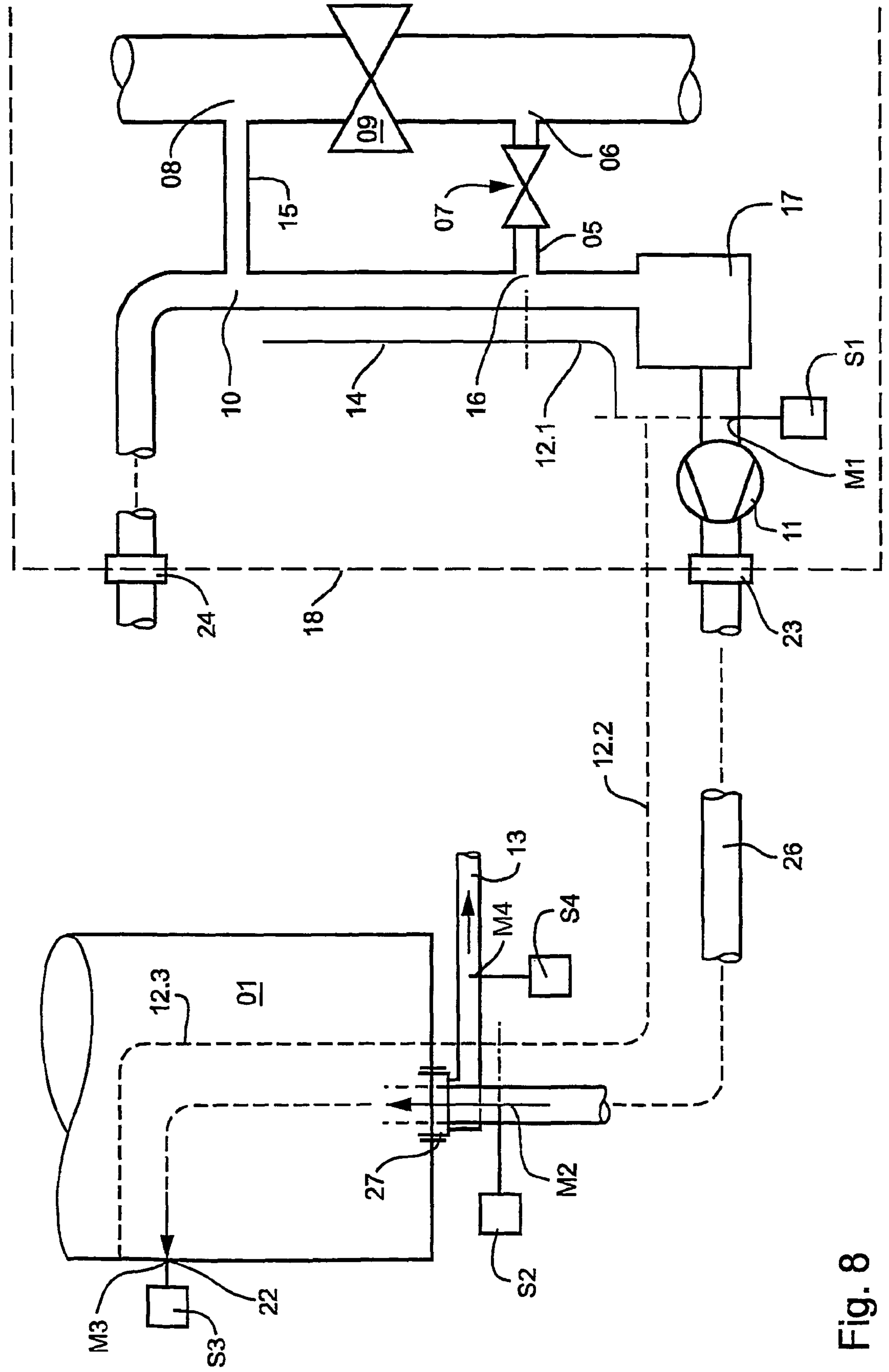

In a further embodiment the measuring point 3 is again omitted, but conclusions regarding the temperature $\Theta_3$ are drawn from empirical values by means of the measured values at the measuring point M2 and the measuring point M4, for example again from a stored connection, an offset, a functional interrelationship and/or by forming an average value from the two measured values. Then for a desired temperature $\Theta_3$, a regulation to a desired temperature $\Theta_2$ as the command variable is performed again, either by taking into consideration the machine or production parameters (inter alia the number of revolutions of the machine, ambient temperature and/or fluid throughput), or to the temperature $\Theta_3$ indirectly determined by means of the two measured values. In FIG. 8, the inflow and outflow of the fluid into or out of the component 01 embodied as a roller 01 or a cylinder 01 are located on the same front face. Accordingly, the rotary leadthrough is embodied here with two connectors or, as represented, with two leadthroughs arranged coaxially inside each other and coaxially in respect to the roller 01. The measuring point M4 is also arranged as closely as possible to the leadthrough.

In the advantageous embodiment of the temperature-control device, it has a swirling section 17, in particular a specially designed swirling chamber 17, in the section 12.1 between the feed-in point 16 and the first measuring point M1. As already mentioned above, the measuring point M1 should be arranged close to the feed-in point, so that as rapid as possible reaction times can be realized in the respective regulation circuit with the measuring point M1 and the actuating member 07. However, on the other hand a homogeneous mixture between the fed-in and the returning fluid (or the heated/cooled fluid) has not yet been achieved closely downstream of the feed-in point, so that errors in the measured values make regulation difficult, and possibly considerably delay reaching of the desired temperature $\Theta_3$ at the component 01.

Figure 9:
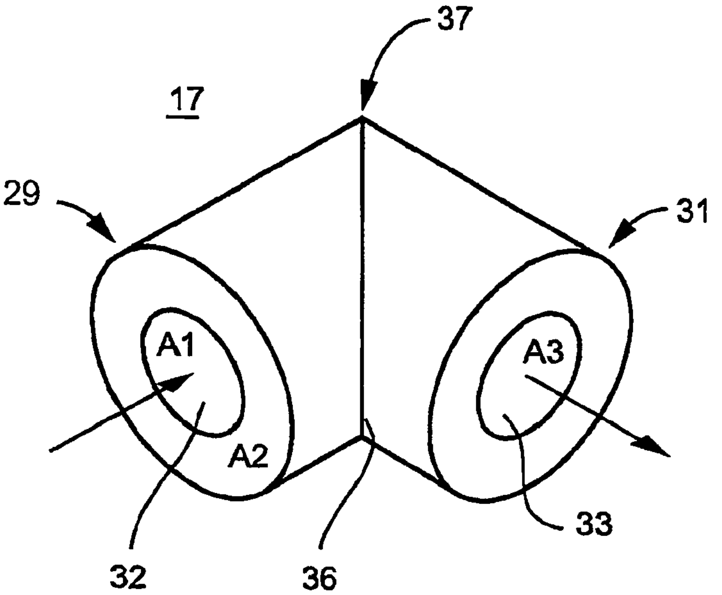
Figure 10:
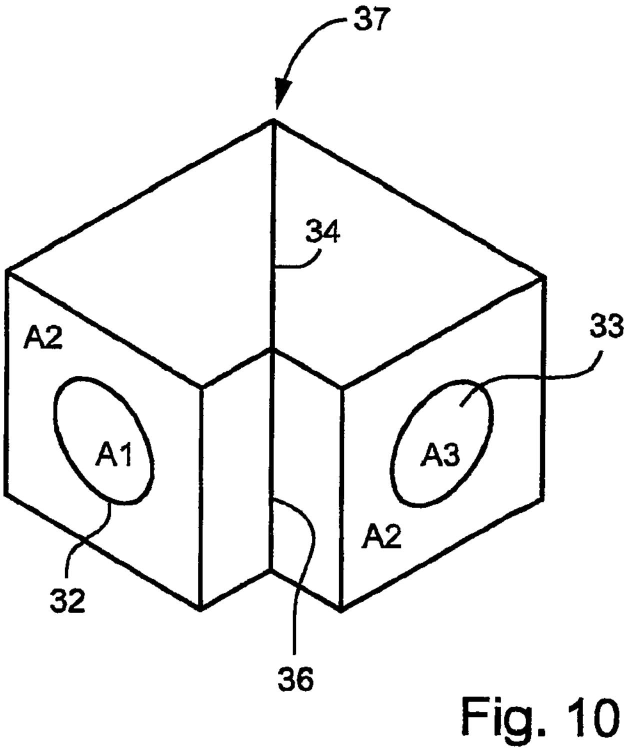

The employment of the swirling section 17, in particular of the specially designed swirling chamber 17, in accordance with FIGS. 9 and 10 assures in a simple manner a dependably mixing of the fluid over a very short distance, so that the above mentioned requirement regarding a short running time T1 can be met.

Initially, a first cross-sectional change takes place in the smallest structural space, wherein a first cross-sectional surface A1 is suddenly increased by a factor f1=2 to a second cross-sectional surface A2. Directly adjoining a change in direction of 70° to 110° takes place, in particular abruptly by approximately 90°, which is followed by a second cross-sectional change, namely a reduction from the cross-sectional surface A2 to the cross-sectional surface A3 by a factor f2 (f2<1). The factor f2 is advantageously selected as f2≦0.5 and has been selected complementary to the factor f1 in such a way that the two cross-sectional surfaces A1, A3 upstream and downstream of the swirling chamber 17 are substantially of the same size.

FIG. 9 shows an embodiment of the swirling chamber 17 with pipe-shaped inlet and outlet areas 29, 31, wherein non-represented pipe-shaped lines with a cross-sectional surface A1 here terminate in centrally arranged openings 32, 33 as the inlet 32 and outlet 33. The joining line of the pipe-shaped inlet and outlet areas 29, 31 does not form a curved pipe with a steadily extending curvature, but instead is embodied with a bent-off edge at least in a plane constituted by the flow directions in the inlet and outlet area (see the bend 36, 37). In a further development, the openings 32, 33 can also be placed non-centered in the surfaces A2, A3.

FIG. 10 shows a preferred embodiment wherein the swirling chamber 17 is embodied with the geometry of a joint between two box-shaped pipes. Here, again, two surfaces A2 have respective openings 32, 33. Here, too, the directional change in the area of the existing or "imaginary" joint 34 between the inlet and the outlet surface has been embodied with (sharp) edges (see bend 36, 37). Again, the openings 32, 33 can be asymmetrically arranged in the surfaces A2.

Figure 11:
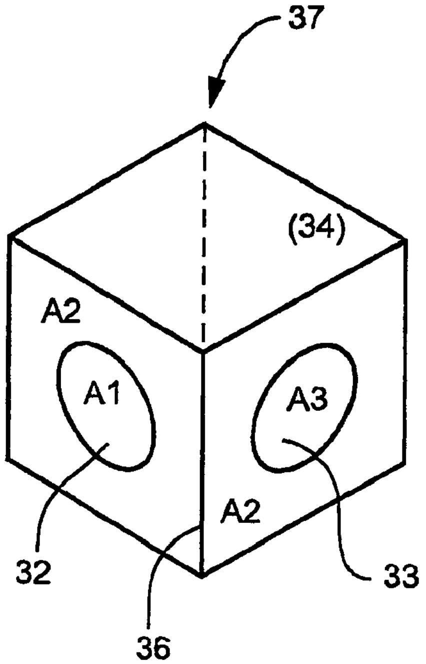

FIG. 11 shows a preferred embodiment wherein the swirling chamber 17 is embodied with the geometry of a cube, in a special design in FIG. 10 as a cube with identical lengths of the lateral edges. In this case two adjoining surfaces A2 each have the openings 32, 33. Here, too, the direction change in the area of the "imaginary joint" (34) between the inlet and the outlet areas is embodied with (sharp) edges (see bend 36, 37). Here, too, the openings 32, 33 can be asymmetrically arranged in the surfaces A2.

While preferred embodiments of a temperature control method, a regulating device, and a temperature control device, in accordance with the present invention have been set forth fully and completely hereinabove, it will be apparent to one of skill in the art that various changes in, for example, the source of supply of the temperature control fluid, the specific structure of the printing press, and the like could be made without departing from the true spirit and scope of the present invention which is accordingly to be limited only by the following claims.

What is claimed is:

1. A method for controlling a temperature of a component of a printing press including the steps of:

providing said component of a printing press as one of a printing press roll and a printing press cylinder;

providing a fluid flow path for said printing press component whose temperature is to be controlled, said fluid flow path including a fluid inflow path to a fluid inlet to said printing press component and a fluid return path from a fluid outlet of said printing press component;

providing a pump in said fluid flow path;

providing a temperature regulating fluid in said fluid flow path;

providing said temperature regulating fluid as a liquid;

providing a feed-in point connected to said temperature regulating fluid in said fluid inflow path;

providing a temperature control source for said temperature regulating fluid and connecting said temperature control source to said feed-in point;

locating said feed-in point remote from said fluid inlet to said printing press component whose temperature is to be controlled;

conducting said temperature regulating fluid to said printing press component along said fluid inflow path from said feed-in point;

determining a first measured value of a temperature of said temperature regulating fluid at a first temperature measuring point;

locating said first temperature measuring point in said fluid inflow path remote from said fluid inlet to said printing press component;

determining a second measured value of said temperature of said temperature regulating fluid at a second temperature measuring point;

locating said second temperature measuring point in said fluid inflow path adjacent said fluid inlet to said printing press component;

locating said first temperature measuring point and said second temperature measuring point spaced apart from each other on said fluid inflow path;

providing a temperature regulating fluid control device;

providing an actuating member in said fluid flow path adjacent said feed-in point;

providing a first, inner control loop in said temperature regulating fluid control device;

providing a second, outer control loop in said temperature regulating fluid control device;

connecting said first, inner control loop and said second, outer control loop in a cascade-like manner;

connecting said temperature regulating fluid control device to said actuating member;

supplying said first measured temperature of said temperature regulating fluid to said inner control loop;

supplying said second measured temperature of said temperature regulating fluid to said outer control loop;

providing a pre-regulation unit and supplying a running time constant of a running time of said temperature regulating fluid in said fluid flow path to said outer control loop;

forming an outer loop corrected command value in said outer control loop using said running time constant and said second measured value of said temperature control fluid at said second temperature measuring point;

supplying said outer loop corrected command value from said outer control loop to said inner control loop;

forming an inner loop corrected command value in said inner control loop using said outer loop corrected command value and said first measured value of said temperature control fluid at said first temperature measuring point;

providing said inner loop corrected command value formed in said temperature regulating fluid control device to said actuating member; and using said temperature regulating fluid control device for operating said actuating member and controlling said temperature control source for controlling a temperature of said temperature regulating fluid in said fluid flow path.

2. The method of claim 1 further including providing a fluid drive mechanism in said fluid inflow path and determining said first measured temperature value after said feed-in point and before said fluid drive mechanism.

3. The method of claim 1 further including providing said second measured temperature measuring point along said fluid inflow path and located, in said running time of said fluid, further than half of a distance from said feed-in point to said component of a printing press.

4. The method of claim 1 further including using a theoretical command variable for forming said outer loop corrected command variable and forming said theoretical command variable in said pre-regulating member in respect to a heat flow value and taking expected heat and cooling losses in said fluid inflow path into consideration.

5. The method of claim 1 further including providing said outer loop corrected command variable for said outer control loop and said inner loop corrected command variable for said inner control loop, pre-regulating a specific excess amplitude by using a derivative member for forming said corrected command variables for said inner and outer control loops.

6. The method of claim 1 further including determining a number of revolutions of said printing press component and using said number of revolutions for pre-regulation for forming said corrected command variable for at least said inner control loop.

7. The method of claim 1 further including pre-regulating actuating member characteristics by using a rise limiter for forming said corrected command variable for at least said inner control loop.

8. The method of claim 1 further including providing a third temperature measuring point and a third control loop in said temperature regulating fluid control device, determining said temperature at said first, second and third temperature measuring points and supplying said temperatures to respectively one of said first, second and third control loops connected to each other in said cascade-like manner.

9. The method of claim 8 further including determining said third temperature measured value as a temperature of a surface of said component of a printing press.

10. The method of claim 8 further including using a temperature of said fluid following its exit from said printing press component as said third measured value.

11. The method of claim 1 further including providing a temperature regulating fluid supply circuit as said temperature control source, circulating said temperature regulating fluid from said temperature regulating fluid supply circuit at least partially in said first fluid flow path, providing said actuating member as a valve and controlling said temperature regulating fluid in said fluid flow path from said temperature regulating fluid supply circuit using said actuating member.

12. The method of claim 1 further including providing a fluid heating and cooling unit in said fluid flow path as said temperature control source and providing said actuating member as an output control for said heating and cooling unit.

13. A device adapted to control the temperature of a component of a printing press comprising:

one of a printing press roll and a printing press cylinder usable as said component of a printing press and having a fluid inlet and a fluid outlet;

a fluid flow path for said printing press component whose temperature is to be controlled, said fluid flow path including a fluid inflow path to said fluid inlet, and a fluid return path from said fluid outlet;

a temperature regulating fluid in said fluid flow path, said temperature regulating fluid being a liquid;

a temperature control source for said temperature regulating fluid in said fluid flow path and being connected at a feed-in point located remote from and before, in a direction of fluid flow, said fluid inlet in said fluid flow path;

a first temperature sensor positioned at a first location in said fluid flow path remote from said fluid inlet and intermediate, in said direction of fluid flow, said feed-in point and said fluid inlet, said first temperature sensor adapted to provide a first temperature of said temperature regulating fluid;

a pump in said fluid flow path, said first temperature sensor being located between said fluid feed-in point and said pump;

a second temperature sensor positioned at a second location in said fluid flow path adjacent said fluid inlet, said second temperature sensor adapted to provide a second temperature of said temperature regulating fluid, said first and second temperature sensors being spaced apart from each other in said fluid inflow path;

means conducting said temperature regulating fluid along said fluid flow path in said direction of fluid flow from said fly feed-in point to and through said printing press component;

a temperature regulating fluid control device;

an actuating member in said fluid flow path adjacent said feed-in point, said actuating member being responsive to said temperature regulating fluid control device;

a first, inner control loop in said temperature regulating fluid control device;

a second, outer control loop in said temperature regulating fluid control device;

means connecting said first, inner control loop and said second, outer control loop with each other in a cascade-like manner;

a pre-regulating member in at least said second, outer control loop and adapted to form one of a running time constant and a replacement time constant, said running time constant being representative of a running time of said temperature regulating fluid flow path;

means to supply said second temperature to said outer control loop and to combine said second temperature with said running time constant to form an outer control loop corrected command value;

means to supply said outer control loop corrected command value to said inner control loop;

means to supply said first temperature to said inner control loop, for use with said outer loop corrected command value, to form an inner control loop corrected value in said inner control loop; and means supplying said inner control loop corrected value from said inner control loop of said temperature regulating fluid control device to said actuating member to operate said actuating member and to control said temperature control source to control a temperature of said temperature regulating fluid in said fluid flow path.

14. The device of claim 13 further including a pre-regulating member in at least said first, inner control loop and adapted to generate a theoretical command variable and which takes expected heat and cooling losses in said fluid flow path into consideration.

15. The device of claim 13 further including a derivative member for each of said at least first and second control loops and adapted to generate a specific amplitude variation during formation of each said command value.

16. The device of claim 13 further including a pre-regulating device in at least said first, inner control loop and adapted to take into consideration a number of revolutions of said printing press component in the formation of said inner control loop command value.

17. The device of claim 13 further including a rise limiter provided as a pre-regulating member for at least said first, inner control loop and adapted to include characteristics of said actuating member during formation of said inner control loop command value.

18. The device of claim 13 further including a third control loop in said temperature regulating fluid control device, said first, second and third control loops being connected to each other in said cascade-like manner, and a third temperature sensor.

19. The device of claim 13 further including PI regulators in said at least first and second control loops.

20. The device of claim 13 further including a fluid conveying drive means in said fluid inflow path, said first temperature sensor being located downstream of said feed-in point and upstream of said drive means.

21. The device of claim 13 wherein said first temperature sensor is arranged downstream of said feed-in point at a distance no greater than a two second running time of said fluid.

22. The device of claim 13 further including a swirl chamber in said fluid inflow path between said feed-in point and said first temperature sensor.

23. The device of claim 13 wherein said printing press is a dampening agent-free offset printing press.

* * * * *